United States Patent
Lu

(10) Patent No.: US 9,319,653 B2
(45) Date of Patent: Apr. 19, 2016

(54) WHITE BALANCE COMPENSATION METHOD AND ELECTRONIC APPARATUS USING THE SAME

(71) Applicant: Acer Incorporated, New Taipei (TW)

(72) Inventor: Jun-Liang Lu, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 14/585,159

(22) Filed: Dec. 29, 2014

(65) Prior Publication Data

US 2015/0245003 A1  Aug. 27, 2015

(30) Foreign Application Priority Data

Feb. 24, 2014  (TW) .............................. 103106041 A

(51) Int. Cl.
H04N 9/04 (2006.01)
H04N 1/60 (2006.01)
H04N 9/73 (2006.01)

(52) U.S. Cl.
CPC ............. *H04N 9/735* (2013.01); *H04N 1/6077* (2013.01); *H04N 1/6086* (2013.01); *H04N 9/04* (2013.01); *G09G 2320/0666* (2013.01)

(58) Field of Classification Search
None
See application file for complete search history.

(56) References Cited

U.S. PATENT DOCUMENTS

| 6,952,225 | B1 * | 10/2005 | Hyodo et al. | 348/223.1 |
| 2004/0201727 | A1 * | 10/2004 | Ichikawa et al. | 348/223.1 |
| 2004/0212691 | A1 * | 10/2004 | Sato | 348/223.1 |
| 2005/0219379 | A1 * | 10/2005 | Shi | 348/223.1 |
| 2006/0176379 | A1 * | 8/2006 | Hyodo | 348/223.1 |
| 2007/0120987 | A1 * | 5/2007 | Kobayashi | 348/223.1 |
| 2008/0101690 | A1 * | 5/2008 | Hsu et al. | 382/162 |

FOREIGN PATENT DOCUMENTS

| CN | 102209246 | 10/2011 |
| CN | 102300100 | 12/2011 |
| JP | 2003299117 | 10/2003 |
| TW | 200829038 | 7/2008 |

\* cited by examiner

Primary Examiner — Shahbaz Nazrul
(74) Attorney, Agent, or Firm — Jianq Chyun IP Office

(57) ABSTRACT

A white balance (WB) compensation method and an electronic apparatus are provided. The method includes the following steps. A first and a second specific color ratios of a predetermined color in a predetermined color temperature are obtained. A first and a second reference color ratios of a reference color in the predetermined color temperature are obtained. An image including pixels is captured, and an exposure index corresponding to the image is obtained. When the exposure index corresponds to the predetermined color temperature, specific pixels are retrieved from the pixels. WB compensation values of the image are calculated according to the specific pixels. An image color temperature of the image is obtained. When the image color temperature corresponds to the predetermined color temperature, the WB compensation values are updated according to the first and second reference color ratios. A WB operation is performed according to the updated WB compensation values.

10 Claims, 2 Drawing Sheets

WHITE BALANCE COMPENSATION METHOD AND ELECTRONIC APPARATUS USING THE SAME

CROSS-REFERENCE TO RELATED APPLICATION

This application claims the priority benefit of Taiwan application serial no. 103106041, filed on Feb. 24, 2014. The entirety of the above-mentioned patent application is hereby incorporated by reference herein and made a part of this specification.

BACKGROUND

1. Technical Field

The invention relates to an image processing method and an electronic apparatus using the same. Particularly, the invention relates to a white balance compensation method and an electronic apparatus using the same.

2. Related Art

Presently, cameras are widely used on mobile devices, and user's requirements on the quality of the captured images are getting higher and higher. Imaging quality of a camera depends on a size of a photo-sensing element and designs of a lens and an aperture. However, limited to a size of the mobile device, designs and quality of optical devices such as the photo-sensing element and the lens, etc. are limited. Therefore, when a post image signal processor (ISP) chip on the mobile device is designed, how to calibrate an exposure and a white balance, etc. of a raw image obtained by the photo-sensing element is an important issue to be developed.

A main purpose of the white balance of the camera is to restore a color temperature of a shooting scene at the moment when the image is captured, so as to restore the color of that moment. However, for the sake of design convenience of an algorithm and due to inadequate computation capability of the ISP chip, a calibration method of the white balance is to change a R:G:B (i.e. red:green:blue) ratio of a grey level and a white color etc. to be 1:1:1 (i.e. a grey world algorithm).

Under a normal light source (for example, the sunlight), the above method is probably applicable to a white balance calibration of the raw image. However, under a light source with a warm color such as a yellow light, etc., the R:G:B ratio of the white color is not 1:1:1, which is probably 1.2:1:0.8. In this case, if the R:G:B ratio of such scene is calibrated to 1:1:1, the white color is changed to pure white, and the other colors are biased to blue.

Besides, in order to calculate the R:G:B ratio, the ISP chip analyses the R:G:B ratio of each pixel of the image, and takes a reciprocal thereof as a RGB compensation value. For example, if the R:G:B ratio of one image is 0.5:1:0.2, the corresponding compensation value thereof is RGB=(2,1,5). Therefore, it is important to effectively obtain valid pixel information to perform the white balance calculation.

In the conventional white balance algorithm, the pixels of the whole image are obtained to perform the white balance calculation. When the raw image includes a large amount of pure color pixels or near pure color pixels, the conventional white balance algorithm probably misjudges the color temperature of the scene, such that the compensated image may have a problem of color distortion. For example, when the raw image includes a large amount of yellow objects or red objects, a red color (R) ratio of the raw image is higher than a blue color (B) ratio. Therefore, the conventional white balance algorithm probably misjudges the scene as a scene with a warm color temperature, and increases a compensation value corresponding to the blue color, which may result in a fact that the compensated image is biased to blue.

SUMMARY

Accordingly, the invention is directed to a white balance compensation method and an electronic apparatus using the same. According to the white balance compensation method, influence of pure color pixels or near pure color pixels on determination of a scene color temperature performed by the electronic apparatus is avoided, so as to achieve a better white color compensation effect.

The invention provides a white balance compensation method, which is adapted to an electronic apparatus. The method includes following steps. A first specific color ratio and a second specific color ratio of a predetermined color in a predetermined color temperature are obtained. A first reference color ratio and a second reference color ratio of a reference color in the predetermined color temperature are obtained. An image including a plurality of pixels is captured, and an exposure index corresponding to the image is obtained, where each pixel has a first color ratio and a second color ratio. When the exposure index corresponds to the predetermined color temperature, a plurality of specific pixels are retrieved from the pixels. A plurality of white balance compensation values of the image are calculated according to the specific pixels. An image color temperature of the image is obtained. When the image color temperature corresponds to the predetermined color temperature, the white balance compensation values are updated according to the first reference color ratio and the second reference color ratio. A white balance operation is performed to each of the pixels according to the updated white balance compensation values to generate a compensated image.

The invention provides an electronic apparatus including an image capturing unit, a storage unit and a processing unit. The storage unit stores a plurality of modules. The processing unit is coupled to the image capturing unit and the storage unit, and accesses the modules to execute following steps. A first specific color ratio and a second specific color ratio of a predetermined color in a predetermined color temperature are obtained. A first reference color ratio and a second reference color ratio of a reference color in the predetermined color temperature are obtained. The image capturing unit is controlled to capture an image including a plurality of pixels, and an exposure index corresponding to the image is obtained, where each pixel has a first color ratio and a second color ratio. When the exposure index corresponds to the predetermined color temperature, a plurality of specific pixels are retrieved from the pixels. A plurality of white balance compensation values of the image are calculated according to the specific pixels. An image color temperature of the image is obtained. When the image color temperature corresponds to the predetermined color temperature, the white balance compensation values are updated according to the first reference color ratio and the second reference color ratio. A white balance operation is performed to each of the pixels according to the updated white balance compensation values to generate a compensated image.

According to the above descriptions, the white balance compensation method and the electronic apparatus using the same can exclude the near pure color pixels when calculating the white balance compensation value of the captured image, so as to avoid causing a negative influence on the compensated image by these pixels.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
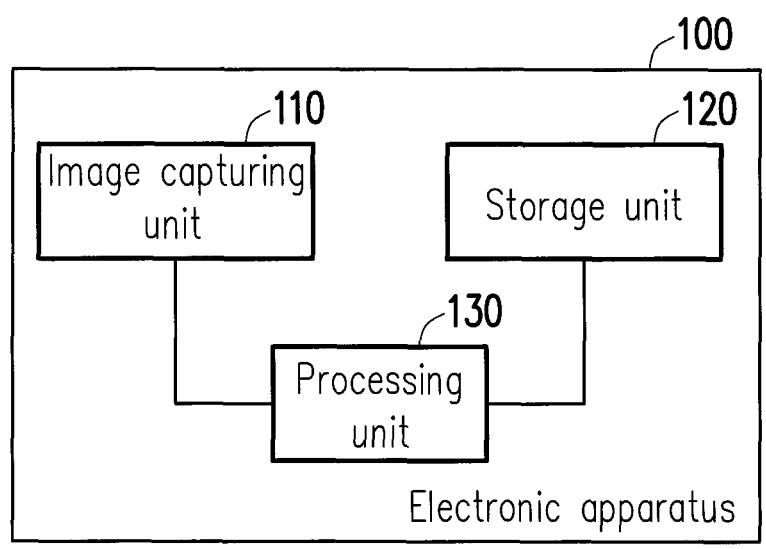
FIG. 1 is a schematic diagram of an electronic apparatus according to an embodiment of the invention.

FIG. 1 is a schematic diagram of an electronic apparatus according to an embodiment of the invention. In the present embodiment, the electronic apparatus 100 includes an image capturing unit 110, a storage unit 120 and a processing unit 130. The electronic apparatus 100 is, for example, a camera, a smart phone, a tablet personal computer (PC), a personal digital assistant or any device capable of capturing images. The image capturing unit 110 is, for example, any video camera having a charge coupled device (CCD) lens, a complementary metal oxide semiconductor transistors (CMOS) lens or an infrared lens, or can be an image capturing device capable of obtaining depth information, for example, a depth camera or a three-dimensional (3D) camera. The storage unit 120 is, for example, a fixed or movable random access memory (RAM) of any type, a read-only memory (ROM), a flash memory, a hard disk or other similar devices or a combination of these devices, which is not limited by the invention.

The processing unit 130 is coupled to the image capturing unit 110 and the storage unit 120. The processing unit 130 is, for example, a general purpose processor, a special purpose processor, a conventional processor, a digital signal processor, a plurality of microprocessors, one or a plurality of microprocessors combined with a digital signal processor core, a controller, a micro controller, an application specific integrated circuit (ASIC), a field programmable gate array (FPGA) circuit, any other type of integrated circuit, a state machine, a processor based on an advanced RISC machine (ARM) and similar products.

In the present embodiment, the processing unit 130 may access a plurality of modules stored in the storage unit 120 to execute various steps of a white balance compensation method provided by the invention.

In general, when a raw image has a large amount of pure color pixels, in order to avoid misjudge of the processing unit 130 on a scene color temperature caused by the pure color pixels, according to the white balance compensation method of the invention, the pure color pixels can be excluded through a suitable manner before a white balance compensation value is calculated. In this way, the processing unit 130 can accurately perform a white balance operation to each pixel in the raw image according to the scene color temperature, so as to avoid an undesired phenomenon that the compensated image is biased to blue or red. Details of the white balance compensation method of the invention are described blow.

Figure 2:
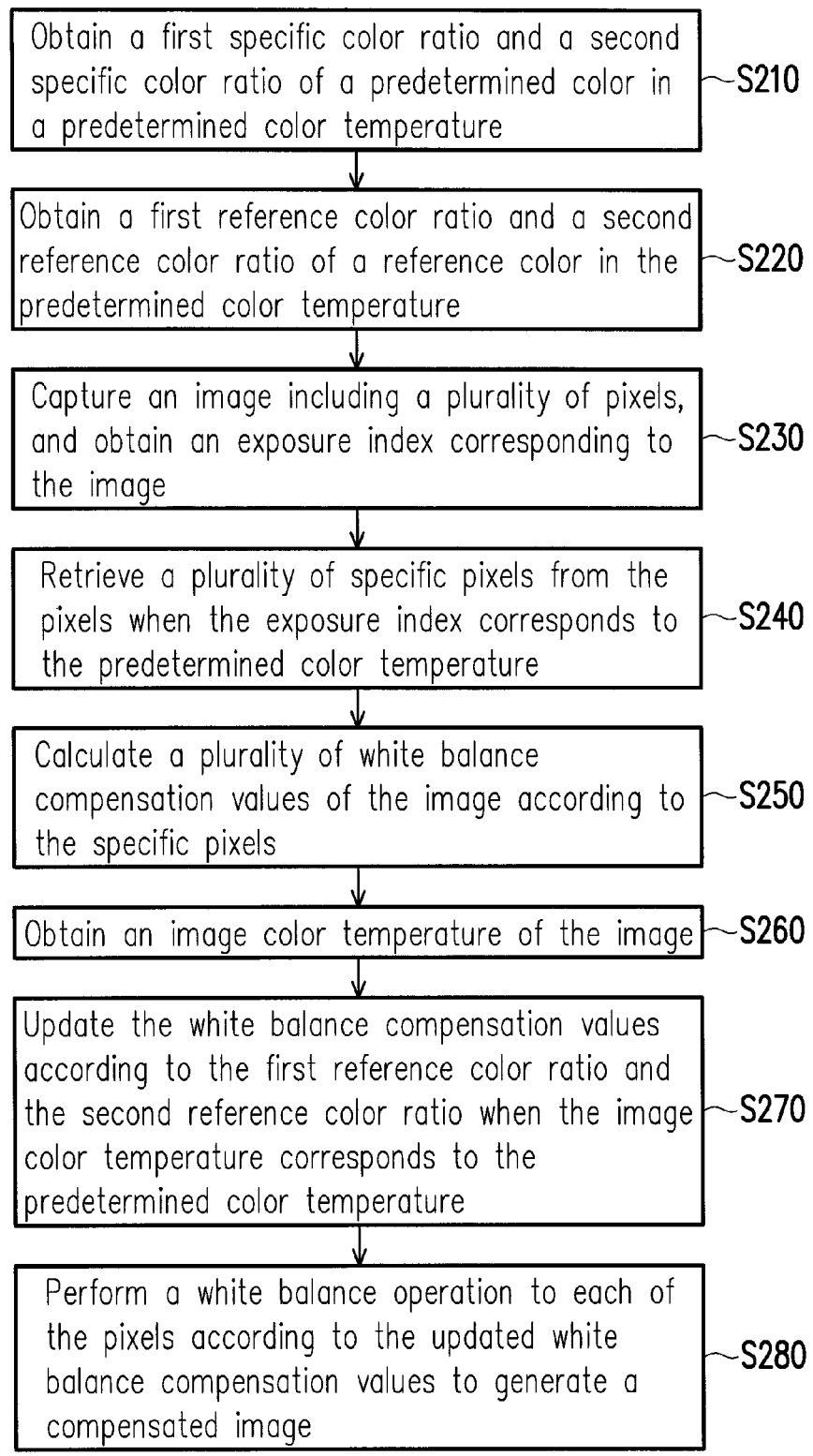
FIG. 2 is a flowchart illustrating a white balance compensation method according to an embodiment of the invention.

FIG. 2 is a flowchart illustrating a white balance compensation method according to an embodiment of the invention. The white balance compensation method of the present embodiment can be executed by the electronic apparatus 100 of FIG. 1, and detailed steps of the method are described below with reference of various components of FIG. 1.

First, in step S210, the processing unit 130 obtains a first specific color ratio and a second specific color ratio of a predetermined color in a predetermined color temperature. The predetermined color is, for example, red, green and/or blue (i.e. three primary colors of light), though the invention is not limited thereto.

In the present embodiment, the predetermined color may include a first component, a second component and a third component. Those skilled in the art should understand that each color can be represented by a specific ratio of a red component, a green component and a blue component (i.e. a R:G:B ratio). Therefore, the first component of the predetermined color is, for example, the red component (R) of the predetermined color, the second component of the predetermined color is, for example, the green component (G) of the predetermined color, and the third component of the predetermined color is, for example, the blue component (B) of the predetermined color, though the invention is not limited thereto.

The predetermined color temperature can be set according to a scene considered by a designer. For example, if the scene considered by the designer is an outdoor environment, the designer can set the predetermined color temperature to, for example, 6500K. If the scene considered by the designer is an indoor environment, the designer can set the predetermined color temperature to, for example, 4500K. If the scene considered by the designer is a low light source environment, the designer can set the predetermined color temperature to, for example, 3000K. Those skilled in the art should understand that the aforementioned values of the predetermined color temperature are only examples, and are not used to limit the invention.

After the predetermined color temperature is set, the processing unit 130 can obtain the first specific color ratio and the second specific color ratio of the predetermined color. In the present embodiment, the first specific color ratio of the predetermined color is, for example, a ratio between the first component of the predetermined color and the second component of the predetermined color. In other words, the first specific color ratio of the predetermined color is, for example, an R/G value of the predetermined color. Moreover, the second specific color ratio of the predetermined color is, for example, a ratio between the third component of the predetermined color and the second component of the predetermined color. In other words, the second specific color ratio of the predetermined color is, for example, a B/G value of the predetermined color.

For example, when the predetermined color and the predetermined color temperature are respectively red and 6500K, the first specific color ratio (i.e. the R/G value) and the second specific color ratio (i.e. the B/G value) of the predetermined color obtained by the processing unit 130 are, for example, respectively 1.85 and 0.01. In this way, when the processing unit 130 detects that the image captured by the image capturing unit 110 corresponds to the color temperature of 6500K (i.e. corresponds to the color temperature of the outdoor environment), the processing unit 130 correspondingly finds pure color pixels (or near pure color pixels) in the image. In detail, when the processing unit 130 detects a pixel with the R/G value greater than 1.85 and the B/G value smaller than 0.01 in the image captured by the image capturing unit 110, the processing unit 130 determines the pixel as a near red object, and excludes such pixel when calculating the white balance compensation value of the image, so as to avoid a negative influence on the compensated image caused by the pixel (for example, the compensated image is biased to blue, etc.).

Then, in step S220, the processing unit 130 obtains a first reference color ratio and a second reference color ratio of a reference color in the predetermined color temperature. In the present embodiment, the reference color is, for example, a white color or a color of other grey level. Similar to the aforementioned description, the reference color may also include a first component (i.e. the red component (R)), the second component (i.e. the green component (G)) and the third component (i.e. the blue component (B)). Moreover, after the predetermined color temperature is set, the first reference color ratio of the reference color is, for example, a ratio between the first component of the reference color and the second component of the reference color. In other words, the first reference color ratio of the reference color is, for example, an R/G value of the reference color in the predetermined color temperature. Moreover, after the predetermined color temperature is set, the second reference color ratio of the reference color is, for example, a ratio between the third component of the reference color and the second component of the reference color. In other words, the second reference color ratio of the reference color is, for example, a B/G value of the reference color in the predetermined color temperature.

For example, when the reference color and the predetermined color temperature are respectively white and 6500K, the first reference color ratio (i.e. the R/G value) and the second reference color ratio (i.e. the B/G value) of the reference color obtained by the processing unit 130 are, for example, respectively 0.8 and 1.4.

Moreover, in other embodiments, the processing unit 130 can also obtain the first reference color ratios and the second reference color ratios of the reference color in a plurality of predetermined color temperatures. For example, the processing unit 130 can obtain the R/G values and the B/G values of the white color in the predetermined color temperature of 6500K, 4500K and 3000K.

In the step S230, the processing unit 130 can control the image capturing unit 110 to capture an image (for example, a raw image) including a plurality of pixels, and obtain an exposure index corresponding to the image.

In case that the exposure index is known, the processing unit 130 can derive an environment corresponding to a scene in the image, and accordingly finds the predetermined color temperature corresponding to the scene in the image. For example, when the exposure index corresponding to the image corresponds to the outdoor environment, the processing unit 130 determines the predetermined color temperature corresponding to the outdoor environment to be 6500K. For another embodiment, when the exposure index corresponding to the image corresponds to the indoor environment, the processing unit 130 determines the predetermined color temperature corresponding to the indoor environment to be 4500K. For still another embodiment, when the exposure index corresponding to the image corresponds to the low light source environment, the processing unit 130 determines the predetermined color temperature corresponding to the low light source environment to be 3000K.

Moreover, in the present embodiment, each pixel has a first color ratio and a second color ratio. In detail, similar to the aforementioned description, each pixel in the image also includes the first component (i.e. the red component (R)), the second component (i.e. the green component (G)) and the third component (i.e. the blue component (B)). The first color ratio is a ratio between the first component of each pixel and the second component of the pixel. In other words, the first color ratio of each pixel is, for example, an R/G value of the pixel. The second color ratio is a ratio between the third component of each pixel and the second component of the pixel. In other words, the second color ratio of each pixel is, for example, a B/G value of the pixel.

In step S240, when the exposure index corresponds to the predetermined color temperature, the processing unit 130 retrieves a plurality of specific pixels from the pixels. Then, in step S250, the processing unit 130 calculates a plurality of white balance compensation values of the image according to the specific pixels.

In the present embodiment, the first color ratio of each specific pixel is smaller than the first specific color ratio, and the second color ratio of each specific pixel is greater than the second specific color ratio. For example, when the exposure index corresponds to the predetermined color temperature of 6500K, the processing unit 130 retrieves the pixels with the R/G value smaller than 1.85 and the B/G value greater than 0.01. Then, the processing unit 130 calculates the white balance compensation values of the image according to the retrieved pixels (i.e. the specific pixels). In an embodiment, the processing unit 130 can calculate the white balance compensation values of the image according to the grey world algorithm, though the invention is not limited thereto.

According to another aspect, when the processing unit 130 calculates the white balance compensation values of the image, the pixels with the RIG value greater than 1.85 and the B/G value smaller than 0.01 are not considered due to that these pixels are probably near red objects. In this way, by using the white balance compensation values calculated by the processing unit 130, the compensated image is not biased to blue.

In an embodiment, in the predetermined color temperature of 6500K, the white balance compensation values (i.e. the RGB compensation values) are, for example, (2.8, 1, 1.05), though the invention is not limited thereto. In other embodiments, the white balance compensation values may include a first compensation value and a second compensation value respectively corresponding to an R value and a B value in the RGB compensation values, though the invention is not limited thereto.

In step S260, the processing unit 130 obtains an image color temperature of the image. Then, in step S270, when the image color temperature corresponds to the predetermined color temperature, the processing unit 130 updates the white balance compensation values according to the first reference color ratio and the second reference color ratio.

In an embodiment of the invention, when a temperature difference between the image color temperature and the predetermined color temperature is smaller than a predetermined threshold (for example, 750K), the processing unit 130 determines that the image color temperature corresponds to the predetermined color temperature. For example, when the image color temperature is 6000K, the processing unit 130 determines that the image color temperature corresponds to 6500K. For another example, when the image color temperature is 5000K, the processing unit 130 determines that the image color temperature corresponds to 4500K, though the invention is not limited thereto.

When the image color temperature corresponds to the predetermined color temperature of 6500K, the way that the processing unit 130 updates the white balance compensation values is to respectively multiply the R value (i.e. the first compensation value) and the B value (i.e. the second compensation value) in the RGB compensation values by the first reference color ratio and the second reference color ratio. Namely, if the RGB compensation values are (2.8, 1, 1.05), the updated RGB compensation values (i.e. the white balance compensation values are, for example, (2.24, 1, 1.47), i.e. (2.8×0.8, 1, 1.05×4).

Then, in step S280, the processing unit 130 performs a white balance operation to each of the pixels according to the updated white balance compensation values to generate a compensated image. In detail, the processing unit 130 can multiply the updated first compensation value (for example, 2.24) by the first color ratio (i.e. the R/G value) of each pixel, and multiply the updated second compensation value (for example, 1.47) by the second color ratio (i.e. the B/G value) of each pixel.

As mentioned in the aforementioned embodiments, since the near red pixels are excluded when the processing unit 130 calculates the white balance compensation values of the image, the compensated image is not biased to blue.

It should be noted that in the aforementioned embodiments, although the predetermined color are all assumed to be the red color, and based on the calculation of the processing unit 130, a negative influence of the red pixels on the compensated image is avoided, those skilled in the art can deduce a corresponding practice when the predetermined color is the blue color (or the green color and other colors). In this way, based on the calculation of the processing unit 130, the negative influence of the blue pixels on the compensated image (for example, the compensated image is biased to red) is avoided.

In detail, the processing unit 130 can obtain the first specific color ratios and the second specific color ratios of a plurality of predetermined colors in a plurality of predetermined color temperatures. For example, the processing unit 130 can obtain the corresponding R/G values and the B/G values of the red color in the predetermined color temperatures of 6500K, 4500K and 3000K. Moreover, the processing unit 130 can also obtain the corresponding R/G values and the B/G values of the green color in the predetermined color temperatures of 6500K, 4500K and 3000K. Moreover, the processing unit can also obtain the corresponding R/G values and the B/G values of the blue color in the predetermined color temperatures of 6500K, 4500K and 3000K. After the R/G values and the B/G values are obtained, the processing unit 130 accordingly obtains the near pure color pixels in the captured image, and excludes these pixels when calculating the white balance compensation values of the image, so as to avoid the negative influence of the pixels on the compensated image.

In summary, after the first and the second specific color ratios of the predetermined color in the predetermined color temperature are obtained, the white balance compensation method and the electronic apparatus using the same of the invention can exclude the near pure color pixels when calculating the white balance compensation values of the image, so as to avoid the negative influence of the pixels on the compensated image. In detail, after the near pure color pixels are excluded, the electronic apparatus can correctly determine the scene color temperature of the captured image, so as to generate suitable white balance compensation values. In this way, even if the raw image includes a large amount of the pure color pixels or the near pure color pixels, the electronic apparatus can still produce the compensated image close to the real scene according to the correct scene color temperature, such that distortion of the compensated image is avoided, i.e. the compensated image is not biased to red or biased to blue.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A white balance compensation method, adapted to an electronic apparatus, the white balance compensation method comprising:
    obtaining a first specific color ratio and a second specific color ratio of a predetermined color in a predetermined color temperature;
    obtaining a first reference color ratio and a second reference color ratio of a reference color in the predetermined color temperature;
    capturing an image comprising a plurality of pixels, and obtaining an exposure index corresponding to the image, wherein each pixel has a first color ratio and a second color ratio;
    retrieving a plurality of specific pixels from the pixels when the exposure index corresponds to the predetermined color temperature;
    calculating a plurality of white balance compensation values of the image according to the specific pixels;
    obtaining an image color temperature of the image;
    updating the white balance compensation values according to the first reference color ratio and the second reference color ratio when the image color temperature corresponds to the predetermined color temperature; and
    performing a white balance operation to each of the pixels according to the updated white balance compensation values to generate a compensated image.

2. The white balance compensation method as claimed in claim 1, wherein the predetermined color comprises a first component, a second component and a third component, the first specific color ratio is a ratio between the first component of the predetermined color and the second component of the predetermined color, and the second specific color ratio is a ratio between the third component of the predetermined color and the second component of the predetermined color,
    wherein the reference color comprises a first component, a second component and a third component, the first reference color ratio is a ratio between the first component of the reference color and the second component of the reference color, and the second reference color ratio is a ratio between the third component of the reference color and the second component of the reference color,
    wherein each pixel comprises a first component, a second component and a third component, the first color ratio is a ratio between the first component of each pixel and the second component of the pixel, and the second reference color ratio is a ratio between the third component each pixel and the second component of the pixel.

3. The white balance compensation method as claimed in claim 2, wherein the first color ratio of each of the specific pixels is smaller than the first specific color ratio, and the second color ratio of each of the specific pixels is greater than the second specific color ratio.

4. The white balance compensation method as claimed in claim 2, wherein the white balance compensation values comprise a first compensation value and a second compensation value, and the step of updating the white balance compensation values according to the first reference color ratio and the second reference color ratio comprises:
    multiplying the first compensation value by the first reference color ratio to generate the updated first compensation value; and multiplying the second compensation value by the second reference color ratio to generate the updated second compensation value.

5. The white balance compensation method as claimed in claim 4, wherein the step of performing the white balance operation to each of the pixels according to the updated white balance compensation values comprises:
   multiplying the updated first compensation value by the first color ratio of each of the pixels; and
   multiplying the updated second compensation value by the second color ratio of each of the pixels.

6. An electronic apparatus, comprising:
   an image capturing unit;
   a storage unit, storing a plurality of modules; and
   a processing unit, coupled to the image capturing unit and the storage unit, and accessing the modules to execute following steps:
      obtaining a first specific color ratio and a second specific color ratio of a predetermined color in a predetermined color temperature;
      obtaining a first reference color ratio and a second reference color ratio of a reference color in the predetermined color temperature;
      controlling the image capturing unit to capture an image comprising a plurality of pixels, and obtain an exposure index corresponding to the image, wherein each pixel has a first color ratio and a second color ratio;
      retrieving a plurality of specific pixels from the pixels when the exposure index corresponds to the predetermined color temperature;
      calculating a plurality of white balance compensation values of the image according to the specific pixels;
      obtaining an image color temperature of the image;
      updating the white balance compensation values according to the first reference color ratio and the second reference color ratio when the image color temperature corresponds to the predetermined color temperature; and
      performing a white balance operation to each of the pixels according to the updated white balance compensation values to generate a compensated image.

7. The electronic apparatus as claimed in claim 6, wherein the predetermined color comprises a first component, a second component and a third component, the first specific color ratio is a ratio between the first component of the predetermined color and the second component of the predetermined color, and the second specific color ratio is a ratio between the third component of the predetermined color and the second component of the predetermined color,
   wherein the reference color comprises a first component, a second component and a third component, the first reference color ratio is a ratio between the first component of the reference color and the second component of the reference color, and the second reference color ratio is a ratio between the third component of the reference color and the second component of the reference color,
   wherein each pixel comprises a first component, a second component and a third component, the first color ratio is a ratio between the first component of each pixel and the second component of the pixel, and the second reference color ratio is a ratio between the third component each pixel and the second component of the pixel.

8. The electronic apparatus as claimed in claim 7, wherein the first color ratio of each of the specific pixels is smaller than the first specific color ratio, and the second color ratio of each of the specific pixels is greater than the second specific color ratio.

9. The electronic apparatus as claimed in claim 7, wherein the white balance compensation values comprise a first compensation value and a second compensation value, and the processing unit
   multiplies the first compensation value by the first reference color ratio to generate the updated first compensation value; and
   multiplies the second compensation value by the second reference color ratio to generate the updated second compensation value.

10. The electronic apparatus as claimed in claim 9, wherein the processing unit
   multiplies the updated first compensation value by the first color ratio of each of the pixels; and
   multiplies the updated second compensation value by the second color ratio of each of the pixels.

\* \* \* \* \*